Sept. 21, 1965   L. E. JARRETT ETAL   3,208,063
ANALOG TO DIGITAL CONVERTER
Filed June 21, 1961

BY *William J. Miller*

ATTORNEY

United States Patent Office 3,208,063
Patented Sept. 21, 1965

3,208,063
ANALOG TO DIGITAL CONVERTER
Lorenzo E. Jarrett and Graydon L. Brown, Ponca City, Okla., assignors to Continental Oil Company, Ponca City, Okla., a corporation of Delaware
Filed June 21, 1961, Ser. No. 118,588
1 Claim. (Cl. 340—347)

The present invention relates to analog to digital converters and more particularly, but not by way of limitation, relates to a device for converting analog data recorded in the form of amplitude modulated magnetomotive force on a magnetizable record medium impressed on a magnetizable record medium into digital values representative of the analog data.

As is known in the art, there are many instances where it is desirable to convert analog or continuous wave data into digital data having finite values which can be used in digital computers and the like. For example, seismic waves recorded during geophysical explorations are commonly a form of analog data. In order to utilize the data fully, it is sometimes necessary to perform Fourier analysis involving lengthy and complicated mathematical formulas. This analysis cannot, as a practical matter, be done without assistance from a computer which normally utilizes digital data.

In previous analog to digital converters it has been necessary to continuously move the record media, such as a magnetic tape or wire, in order to detect the remanent magnetomotive force or magnetic flux stored on the record. Very complicated converter devices have been required to periodically convert the measured analog value to a finite digital value while the measured value was continually fluctuating due to the record medium being continually in motion. This type converter device was required to have an almost instantaneous ability to convert the analog value to a digital value and, therefore, was very expensive. Also, the recording means for storing the digital data in usable form was required to operate at a relatively high rate of speed, which also resulted in expensive, complicated recording devices.

In accordance with the present invention, a readout means is provided for producing an electrical signal proportional to the remanent magnetomotive force or magnetic flux at each of a succession of predetermined sampling points along the record medium while the record medium is held motionless relative to the readout means. A highly simplified converter means is provided for successively producing a signal having a digital value corresponding to each of the successive signals from the readout means. An indexing means is then provided for successively positioning predetermined sampling points of the record medium adjacent the readout means for whatever period of time is required to produce the readout signal and convert the readout signal to a digital value. In this manner, successive digital values will be produced corresponding to the analog data stored on the record at each of the successive, predetermined sampling points.

Therefore, it is an important object of the present invention to provide a more economical device for converting analog data to digital data.

Another object of the present invention is to provide a readout means capable of detecting and measuring magnetomotive force or magnetic flux without relative motion between the flux and the readout means.

Another object of the present invention is to provide a readout device of the type described which furnishes a constant electrical signal for as long as is required to convert the signal to a finite digital value and to record the digital value as desired.

Another object of the present invention is to provide a device of the type described which utilizes a digital voltmeter for converting any given potential to a corresponding finite digital value.

Still another object of the present invention is to provide a readout means having a phase-sensitive detector for providing a direct current readout signal proportional to and having a polarity corresponding to the polarity of the recorded magnetic flux.

Additional objects and advantages of the present invention will be evident from the following detailed description and drawings wherein.

Figure 1:
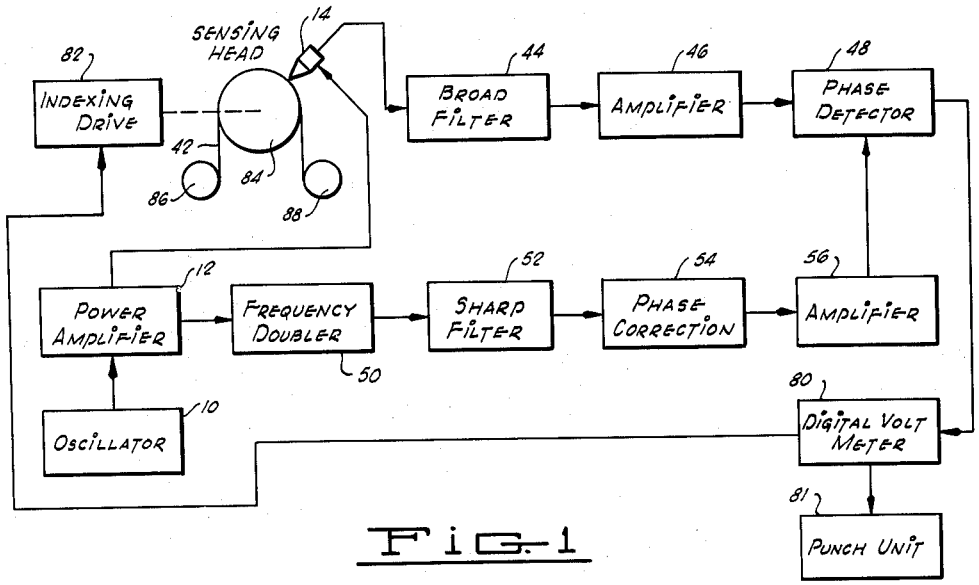
FIGURE 1 is a schematic electrical diagram of a device in accordance with the present invention.

Referring now to the drawings, an oscillator 10 (FIG. 1) produces an alternating current exciter signal of 5,000 cycles per second, for example. The A.C. exciter signal is fed to a power amplifier 12 and from the power amplifier to a magnetic sensing head 14. The sensing head 14 is shown in detail in FIG. 2 and comprises a pair of elongated, curved magnetic core pieces 16 and 18 which are interconnected by two core pieces 20 and 22. The core pieces 16 and 18 form an air gap 24 between adjacent ends thereof and, when taken in combination with the core pieces 20 and 22, form a first magnetic flux or reluctance loop broken by the air gap 24. The two core members 20 and 22 taken in combination with the upper ends 17 and 19 of the cores 16 and 18, respectively, form a continuous or closed second magnetic flux loop.

The A.C. exciter signal from the oscillator 10 and the power amplifier 12 is connected to leads 26 and 28 of the exciter windings 30 and 32, respectively. The exciter windings 30 and 32 are connected in series and are inductively coupled to the core members 20 and 22, respectively. The exciter windings 30 and 32 are wound in such a manner as to create a continuous loop of magnetic flux in the continuous second magnetic flux loop. During one half-cycle of the A.C. exciter signal, magnetic flux is induced in the direction of solid arrows 20a in core 20 and 22a in core 22, for example. Then, during the next half-cycle when the polarity of the current is reversed, magnetic flux is induced in cores 20 and 22 in the direction of dotted arrows 20b and 22b, respectively.

Carrier signal windings 34 and 36 are inductively coupled to the cores 20 and 22, respectively. However, the carrier signal windings 34 and 36 are oppositely wound so that when flux in the core 20 is equal to the flux in the core 22, the buildup and collapse of the magnetic flux due to the A.C. exciter signal will induce a current in winding 34 which is equal and opposite to the current generated in winding 36. Therefore, the net output from the carrier windings through leads 38 and 40 is zero and no carrier signal is generated. The same cancelling effect of the currents generated in the windings 34 and 36 takes place during the next half-cycle of the exciter signal when the flux is reversed in both cores 20 and 22 so that no carrier signal is generated during either the positive or negative half-cycles of the A.C. exciter signal.

When the air gap 24 is positioned in the presence of a magnetomotive force, such as when the air gap is disposed adjacent a magnetic tape 42 having information recorded thereon, the magnetomotive force creates magnetic flux in the first magnetic loop. The magnitude of the magnetic flux created in the first magnetic loop is proportional to the magnitude of the magnetomotive force or remanent magnetic flux on the magnetic tape 42 and the flux in the first magnetic loop may be in the direction of solid arrows 16a and 18a when the polarity of the recorded flux is in one direction and in the opposite direction of dotted arrows 16b and 18b when the polarity of the recorded flux is reversed.

Assume now that during the first half-cycle a of the exciter signal (see FIG. 5) magnetic flux is induced in cores 20 and 22 in the direction of solid arrows 20a and 22a, respectively. Also assume that magnetic flux is disposed adjacent air gap 24 which has a polarity causing a magnetic flux in the first magnetic loop in the direction of solid arrows 16a and 18a. The flux indicated by arrows 16a and 18a will also pass through the cores 20 and 22 in equal amounts. Therefore, during the half-cycle a, the flux in the direction of arrow 20a will be increased and the flux in the direction of arrow 22a will be decreased. During the buildup of the flux during the first half-cycle a of the exciter signal, the current generated in winding 34 will be greater than the opposing current induced in winding 36. Therefore, during the buildup of the flux, a positive half-cycle e of the carrier signal is generated. As the flux in the direction of arrows 20a and 22a collapses, a negative half-cycle f of opposite polarity is induced.

During the next half-cycle b of the A.C. exciter signal, the flux in the cores 20 and 22 will be reversed to correspond to the dotted arrows 20b and 22b, respectively. The polarity of the magnetomotive force adjacent the air gap 24 remains the same and the flux indicated by arrows 16a and 18a will remain. Now, the flux in the first loop will add to the flux indicated by arrow 22b and subtract from the flux indicated by arrow 20b and will produce a carrier signal half-cycle g as the flux builds and a half-cycle h as the flux collapses. It will be noted that the carrier signal is the second harmonic of the exciter signal and therefore is double the frequency of the exciter signal.

Figure 5:
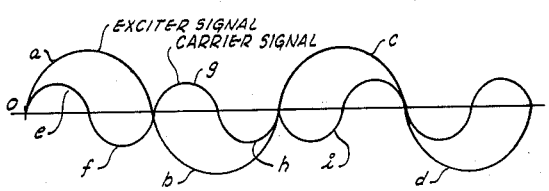
FIGURE 5 is a graph illustrating the relationship between the exciter signal and the carrier signal of a device constructed in accordance with the present invention.

If the magnetomotive force adjacent the air gap 24 is reversed so that flux is induced in the cores 16 and 18 in the direction of dotted arrows 16b and 18b, the phase of the carrier signal will be reversed as shown in FIG. 5 during the half-cycles c and d of the A.C. exciter signal. This results from the fact that during the positive half-cycle c of the exciter signal, the flux in core 20 will now be less than the flux in core 22 and a greater current will be induced in carrier winding 36 than in carrier winding 34 so that a negative half-cycle i is generated. Each subsequent half-cycle of the carrier signal is reversed from the previous case described when the polarity of the record flux was of the opposite polarity. The carrier signal is still the second harmonic of the exciter signal but is merely reversed in phase from the carrier signal which resulted from the opposite polarity of the magnetomotive force adjacent the air gap 24.

The carrier signal from the magnetic sensing head 14 is passed (FIG. 1) through a broad band filter 44 to eliminate undesirable side harmonics and then is passed through a power-type amplifier 46. The amplified carrier signal is then applied to the primary winding of a phase-sensitive detector 48 where the magnitude and phase of the carrier signal are detected, as hereafter described in detail.

A part of the exciter signal from the power amplifier 12 is fed to a frequency doubler 50. The frequency doubler 50 may utilize the full wave rectifier principle to produce a frequency corresponding to the carrier signal produced in the sensing head 14, which, as previously mentioned, is twice the frequency of the exciter signal. The output from the frequency doubler is then passed through a sharp filter 52 to eliminate all undesirable harmonics and then through a phase correction network 54. The phase correction network 54 is used to compensate for any phase shift due to the physical components of the electronic circuit and is adjusted to generally match the phase of the double exciter signal to the phase of the carrier signal from the sensing head 14. The output from the phase correction network 54 is then passed through a driver amplifier 56 and to the phase-sensitive detector 48.

Figures 2, 4:
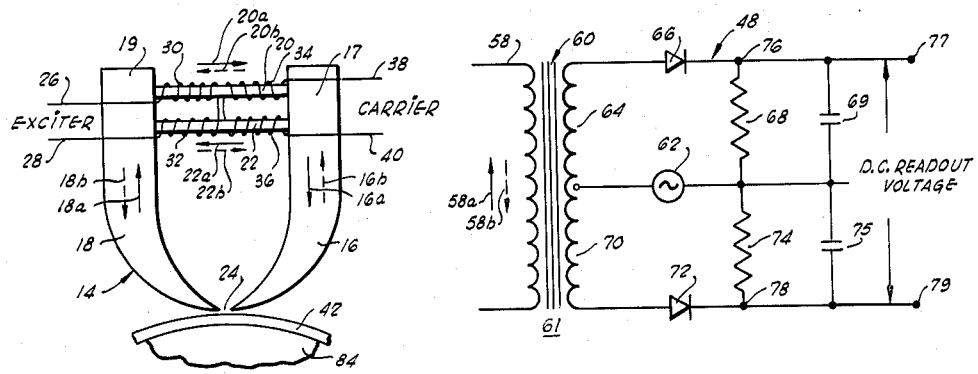
FIGURE 2 is a side view of the sensing head of the device of FIG. 1.
FIGURE 4 is a circuit diagram of the phase-sensitive detector of FIG. 1.

The phase-sensitive detector 48 is shown in detail in the schematic diagram of FIG. 4. The output from the carrier signal amplifier 46 of FIG. 1 is connected to a winding 58 which is inductively coupled to a core 60 of a transformer 61. The output from the driver amplifier 56, which is the doubled exciter signal, is represented by the oscillator symbol 62. The oscillator 62 is a common leg of two similar loop circuits. One of the loop circuits is comprised of the oscillator 62, a winding 64, a diode 66 and a resistor 68. Current in the conventional sense can only flow clockwise in this loop circuit because of the diode 66 and therefore flows only for a half-cycle of the doubled exciter frequency from the oscillator 62. The other loop is comprised of the oscillator 62, a winding 70, a diode 72 and a resistor 74. Current can flow only in the counterclockwise direction in this loop because of diode 72. The windings 64 and 70 are inductively coupled to the core 60 and therefore to winding 58. Capacitors 69 and 75 may be connected in parallel with resistors 68 and 74, respectively, in the conventional manner to assist in filtering undesirable frequencies, as will hereinafter be described in detail, and provide a more stable D.C. readout voltage to the readout terminals 77 and 79.

If no carrier signal is being generated at the sensing head 14, no current will be present in the winding 58. Therefore, during the half-cycle of the doubled A.C. signal from the oscillator 62 when the diodes 66 and 72 conduct, equal current will flow through the two loop circuits, i.e., the clockwise current through winding 64 and diode 66 will equal the counterclockwise current through winding 70 and diode 72. In this case, the potential of junction 76 will be positive and will be equal to the potential of junction 78. Therefore, the potential between the readout terminals 77 and 79 is also zero.

When a magnetomotive force is disposed adjacent the air gap 24, a carrier signal will be generated as previously described and applied to the winding 58. During the half-cycle when the diodes 66 and 72 conduct, the current in winding 58 will be in only one direction, for example, in the direction of solid arrow 58a. The current in the winding 64 will then be complemented and the current in the winding 70 will be opposed, and the potential at the junction 76 will be more positive than the potential at the junction 78. Therefore, a D.C. readout voltage will be produced at the readout terminals 77 and 79, with terminal 77 being positive. Since the carrier frequency in the winding 58 is the same as the frequency from the oscillator 62, during each half-cycle that the diodes 66 and 72 conduct, the current in the winding 58 will be in the direction of solid arrow 58a. The capacitors 69 and 75 function to eliminate undesirable frequencies and provide a stable D.C. voltage at the readout terminals 77 and 79. Therefore, a continuing D.C. signal of constant polarity will be producded at terminals 77 and 79 so long as the same carrier signal is applied to winding 58.

When the polarity of the magnetomotive force disclosed adjacent the air gap 24 is reversed, the phase of the carrier signal will be reversed as previously described in connection with FIG. 5. Then, during the half-cycle when the diodes 66 and 72 conduct, the current in the winding 58 will be in the direction of dotted arrow 58b. The current in the winding 70 will then be complemented and the current in winding 64 will be opposed so that the potential of junction 78 will be more positive than the potential of junction 76, and the D.C. readout voltage at the terminals 77 and 79 will be of reversed polarity. Regardless of the polarity of the magnetomotive force of the record tape and the phase of the carrier signal, the magnitude of the D.C. readout voltage is proportional to the magnitude of the A.C. carrier signal and therefore to the magnitude of the magnetomotive force.

The readout voltage from the phase-sensitive detector 48 is fed to a digital voltmeter 80. The digital voltmeter may be any one of the many known devices in the art which will convert direct current voltage of any value to the nearest finite digital value within the design of the particular digital voltmeter. For example, if it is desired to produce a digital value corresponding to the nearest 0.01 volt and the readout voltage from the phase-sensitive detector 48 is 7.837 volts, the digital voltmeter would select a finite value corresponding to 7.84 volts. The output from the digital voltmeter is then fed to a punch unit 81 or any other suitable recording means for recording the digital value. The punch unit 81 is conveniently of the punched paper tape type and may use the binary code system, for example. After the digital voltmeter has selected the nearest digital value corresponding to the D.C. readout voltage from the phase detector, and the punch unit has recorded the value in coded form, a signal is sent to an indexing drive 82.

When the indexing drive receives the signal from the digital voltmeter, an index drum 84 is automatically rotated through an arbitrarily predetermined angle. The record medium 42 may be stored on a suitable storage reel 86 and passed over the indexing drum 84 to a take-up reel 88. The indexing drum 84 is so positioned relative to the sensing head 14 that the record tape 42 is disposed adjacent the air gap 24 of the sensing head 14 substantially as shown in FIG. 2.

Figure 3:
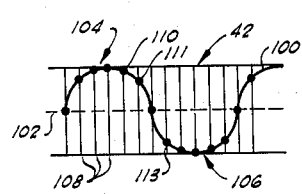
FIGURE 3 is a diagrammatic illustration of the record means from which the analog data is taken and serves to illustrate the operation of the device of FIG. 1.

Referring now to FIG. 3, a magnetizable record medium, such as a conventional magnetic tape 42, has amplitude varying and polarity varying magnetic flux impressed thereon, the magnetic flux being represented by the curve 100. The curved portion 104 above the center line 102 represents magnetic flux having one polarity and the section 106 below the center line 102 represents magnetic flux of the opposite polarity. As previously mentioned, the tape 42 is passed over the indexing drum 84 and disposed adjacent the air gap 24 of the sensing head 14 as shown in FIG. 2. The indexing drive 82 is so keyed as to successively stop the record tape 42 with the successive sampling points indicated generally by reference numeral 108 disposed adjacent the air gap 24. For example, when a particular sampling point 110 of the curve is disposed adjacent the air gap 24, a carrier frequency will be induced in the carrier windings 34 and 36 corresponding to the magnitude of the magnetic flux at sampling point 110 in the manner previously described. The phase of the carrier frequency will correspond to the polarity of the flux at point 110. So long as the tape 42 is positioned with sampling point 110 adjacent the air gap 24, the D.C. readout voltage from the phase-sensitive detector 48 to the digital voltmeter will remain constant. The digital voltmeter 80 then proceeds through its hunting cycle until the digital value corresponding to the D.C. readout voltage is found. Then a coded signal corresponding to the digital value selected by the digital voltmeter 80 is fed to the punch unit 81 to record the digital value for the particular sampling point 110. When the conversion and recordation are completed, a signal is sent to the indexing drive 82 and the indexing drum 84 is rotated until the next successive sampling point 111 of the record media 42 is moved adjacent the air gap 24. The D.C. readout voltage from the phase-sensitive detector 48 then decreases in magnitude and the digital voltmeter 80 selects a lower digital value which is recorded by the punch unit 81.

When, after successive stops at each of the sampling points, the point 113 is disposed adjacent the air gap 24, the polarity of the remanent magnetic flux on the record tape 42 will have been reversed. The reversal in polarity of this flux causes a reversal in the direction of the magnetic flux in the first magnetic loop which includes the air gap 24 which results in a reversal of the phase of the carrier frequency. The phase reversal in the carrier frequency results in a reversed polarity across the winding 58 of the transformer 61 during the half-cycle of the oscillator 62 during which diodes 66 and 72 conduct which results in a reversal in polarity across the readout terminals 77 and 79 of the phase-sensitive detector. The reversed polarity of the D.C. readout voltage supplied to the digital voltmeter is then converted, taking into account the reversed polarity, to a digital value and recorded by the punch unit.

From the above detailed description of a particular embodiment of the present invention, it will be evident that a device has been disclosed for converting analog information stored on a magnetizable record medium to digital data which is representative of the analog data and can be used in digital electronic calculators. The described combination of components permits the use of relatively slow and inexpensive voltage converters and recorders and yet attains a high degree of accuracy. It will be noted that the system is capable of detecting static magnetic flux with a high sensitivity. A slight variation in magnetic flux adjacent air gap 24 causes a variation twice as great in the generated carrier signal because the difference between the flux in cores 20 and 22 is equal to the amount added to one and subtracted from the other. The same doubling process takes place at the phase-sensitive detector where the current in one of the windings 64 or 70 of transformer 61 is increased while the current in the other is decreased. Therefore, a variation in the recorded magnetomotive force adjacent the air gap will cause a variation four times as great in the D.C. readout voltage from the phase-sensitive detector. Also, the use of both phases of the A.C. signal provides a greater range in the digital voltmeter with only half the maximum voltage. This permits a design employing more inexpensive components.

Having thus described a particular embodiment of our invention, it is to be understood that various changes and substitutions may be made therein without departing from the spirit and scope of our invention as defined by the appended claim.

We claim:

A device for converting analog data represented by remanent magnetic flux recorded on a record medium to digital data representative of the analog data, comprising:
a static magnetic flux sensing head for producing an electrical signal proportional to the remanent magnetic flux at a sampling point of the record medium disposed adjacent the read out means, an analog to digital converter means for producing a signal having a digital value corresponding to the electrical signals from the sensing head, an indexing means for successively positioning predetermined sampling points of the record medium adjacent the sensing head, means for connecting said indexing means to said analog to digital converter output such that said indexing means will be automatically activated in response to a signal therefrom to position the next successive sampling point of the record medium adjacent the sensing head after said converter has produced a digital signal representative of the remanent magnetic flux at a particular sampling point.

References Cited by the Examiner

UNITED STATES PATENTS

| | | | |
|---|---|---|---|
| 2,722,569 | 11/55 | Loper | 340—174.1 |
| 2,870,267 | 1/59 | Duinker et al. | 340—174.1 |
| 2,879,126 | 3/59 | James | 340—174.1 |
| 2,914,248 | 11/59 | Ross et al. | 235—159 |
| 3,027,549 | 3/62 | Allen | 340—174.1 |

MALCOLM A. MORRISON, *Primary Examiner.*